United States Patent
Hotz et al.

[19]

[11] Patent Number: 6,109,946

[45] Date of Patent: Aug. 29, 2000

[54] CONNECTION BETWEEN POWER LEAD AND ELECTRICALLY HEATABLE CATALYTIC CONVERTER

[75] Inventors: Uwe Hotz, Loffenau; Raffaele Stamerra, Au am Rhein; Marcus Abele, Marxzell-Burbach; Hagen Fischer, Munich, all of Germany

[73] Assignee: Heraeus Electro-Nite International N.V., Houthalen, Belgium

[21] Appl. No.: 09/000,472

[22] PCT Filed: Jun. 24, 1997

[86] PCT No.: PCT/EP97/03316

§ 371 Date: May 15, 1998

§ 102(e) Date: May 15, 1998

[87] PCT Pub. No.: WO98/01653

PCT Pub. Date: Jan. 15, 1998

[30] Foreign Application Priority Data

Jul. 10, 1996 [DE] Germany ................. 196 27 840

[51] Int. Cl.[7] ............................................. H01R 13/62
[52] U.S. Cl. .................. 439/322; 439/784; 439/805; 422/174
[58] Field of Search ........................... 439/320, 322, 439/313, 913, 916, 578, 784, 805, 394; 422/174; 174/65 SS

[56] References Cited

U.S. PATENT DOCUMENTS

| | | | |
|---|---|---|---|
| 2,294,432 | 9/1942 | Weidner | 439/322 |
| 2,959,764 | 11/1960 | Barr | 439/805 |
| 2,982,937 | 5/1961 | Gregoire et al. | 439/322 |
| 4,368,940 | 1/1983 | Sugiura | 439/916 |
| 5,618,200 | 4/1997 | Norgaard | 439/784 |
| 5,763,833 | 6/1998 | Bawa et al. | 439/394 |

*Primary Examiner*—Paula Bradley
*Assistant Examiner*—Tho D. Ta
*Attorney, Agent, or Firm*—Antonelli, Terry, Stout & Kraus, LLP

[57] ABSTRACT

There is a connection between on the one hand an electrical power lead made as a metal-clad cable with at least one electrical inner conductor electrically insulated from the metal shroud by a mineral and on the other a device to be electrically connected thereto, especially an electrically heatable catalytic converter, the inner conductor and the device being connected to one another via a detachable terminal connection, one part of which being located on the device and its other part being provided on the free end of the power lead.

10 Claims, 3 Drawing Sheets

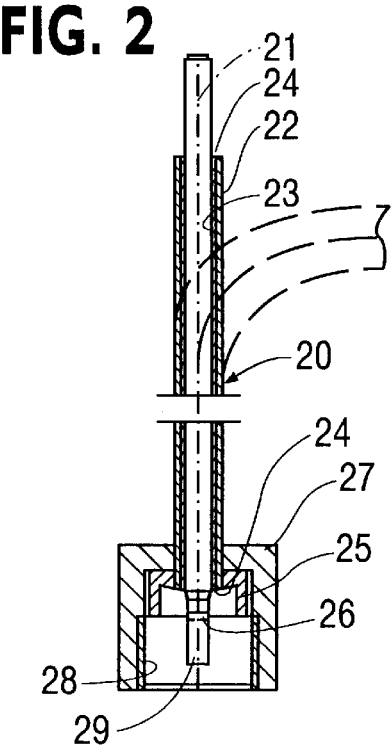
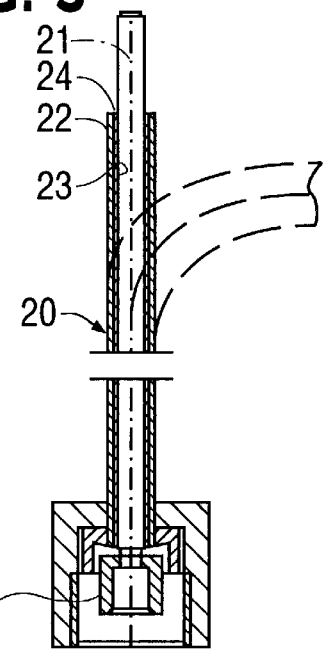
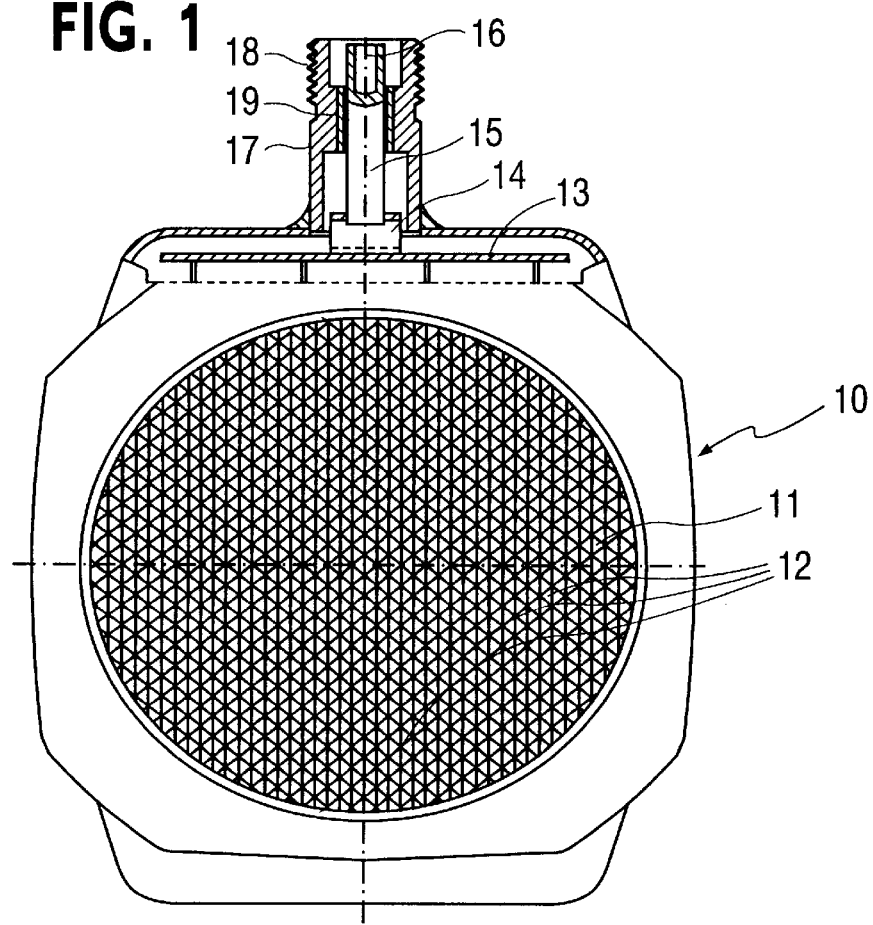

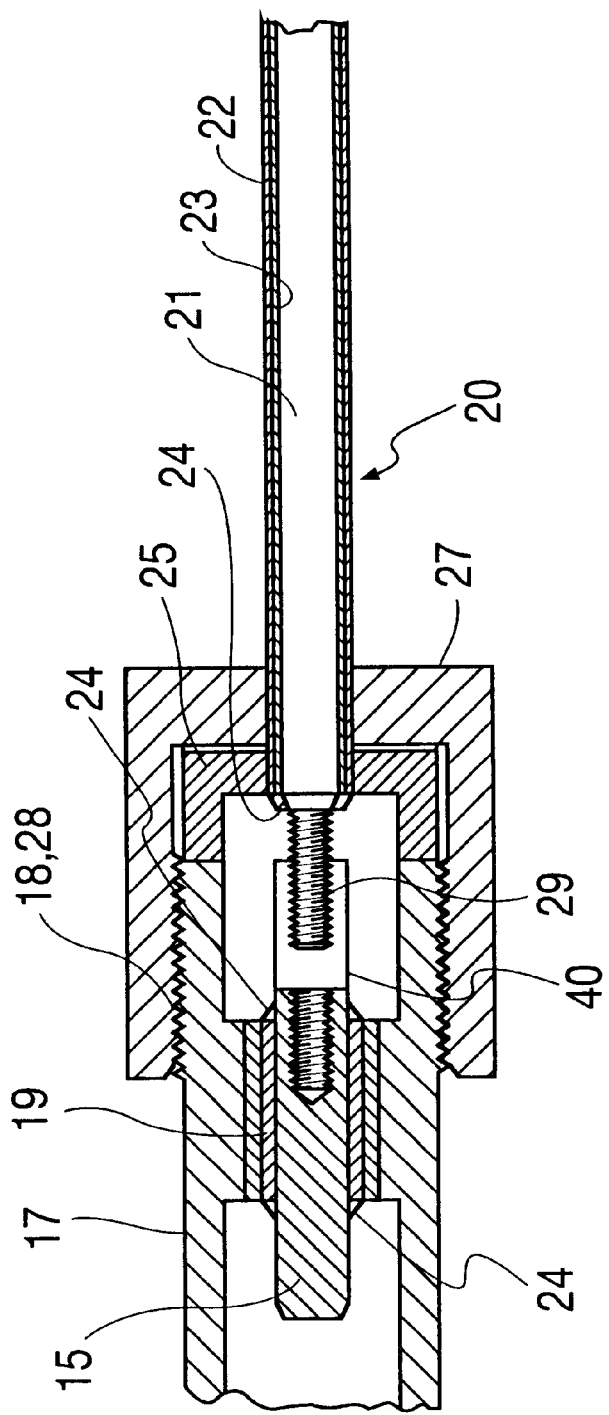
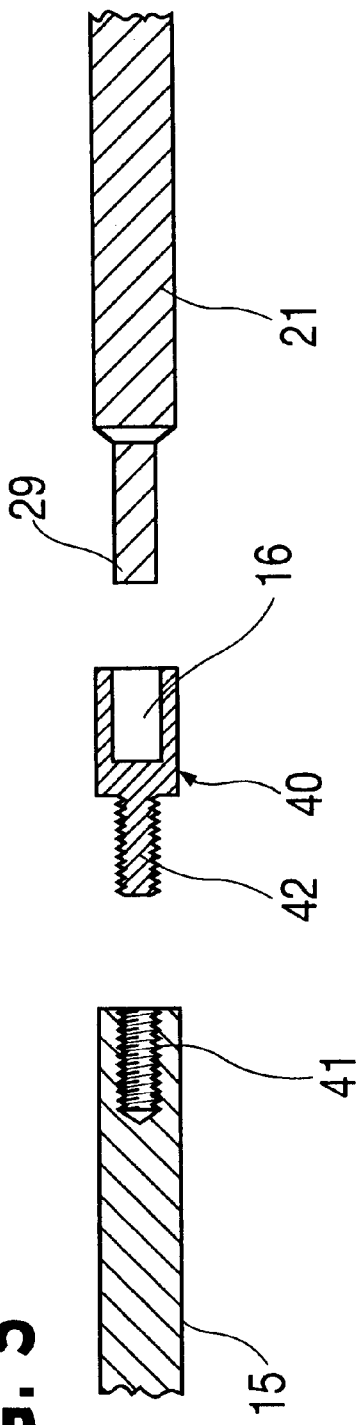
FIG. 4
FIG. 5

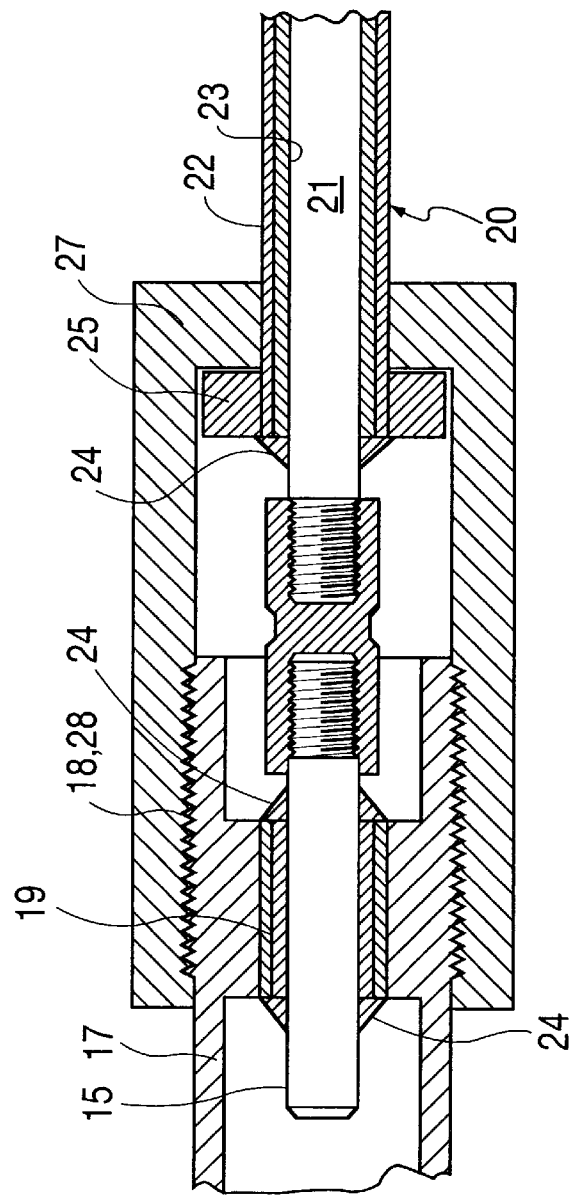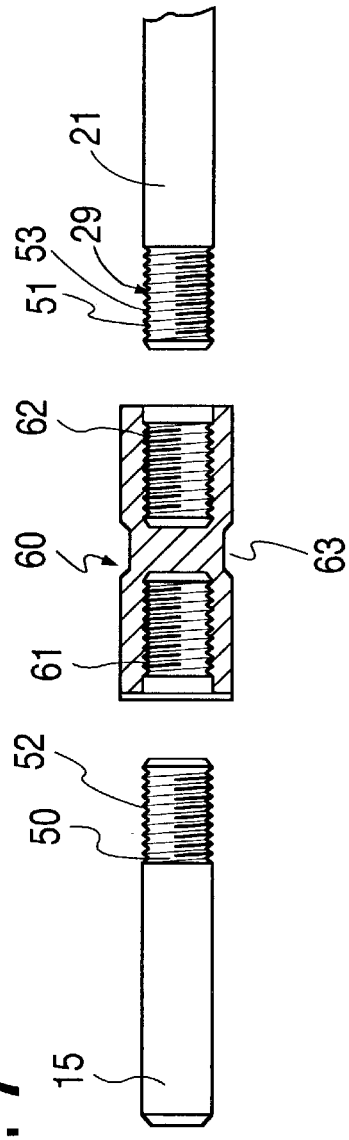
FIG. 6
FIG. 7

6,109,946

CONNECTION BETWEEN POWER LEAD AND ELECTRICALLY HEATABLE CATALYTIC CONVERTER

BACKGROUND OF THE INVENTION

The invention relates to a connection between a power lead and a device to be electrically connected to it, especially to an electrically heatable catalytic converter.

These catalytic converters are considered to be known (DE-44 35 784). They have a metal housing with the actual catalytic converter which is located therein, which is exposed to the exhaust gas flow, and which is provided with electrical resistance heating. Outside the housing, through an opening, an electrical power lead is routed. The electrical power lead is made as a metal-clad cable with at least one inner conductor which is electrically insulated from the metal shroud by a mineral, which is joined by force-fit to the electrical resistance heating, the metal shroud being routed through the opening into the metal housing and being joined gas-tight by welding or soldering to it along the edge of the opening.

In case of repair, the long, expensive metal-clad cable must be removed with the catalytic converter; this is complicated. In addition, electrical contact with at least a one-time repair possibility with long term stability is not possible in these known articles.

SUMMARY OF THE INVENTION

Therefore the object of the invention is to enable safe, electrical contacting with long term stability with at least a one-time repair possibility (separation of the device and power lead).

Here a two-part detachable connection, of which one part is located on the device and the other part is located on the end of the metal-clad cable, is plugged into one another in the manner of a plug-and-socket connection and is joined intimately together in this state, i.e., by self-adhesion or by means of an interference fit, by which a safe long-term connection is achieved which is reliable, permanent and can also be used at high temperatures. Furthermore, there are no surfaces which can be fouled and oxidized, as for example in terminal contacts. In case of repair, however, a good electrical connection is bought at the cost of more expensive replacement of the (original) metal-clad cable for a self-adhering electrical connection. Thus the inner conductor of the metal-clad cable must be separated by a tool and then either a replacement metal-clad cable with a fitting sleeve on its one end must be used which surrounds the outside of one part (bushing) within which the cut-off inner conductor of the power lead has remained, or the fitting sleeve is seated on the separated end of the inner conductor of the metal-clad cable and fixed in position, for example, welded.

Instead of the self-adhesive connection, there is a second version for avoiding a separate replacement metal-clad cable with the fitting sleeve. Here the original metal-clad cable which can be replaced any number of times can be used by means of a screwed connection, for which on one part on the device there is a screw-on section with a blind hole for holding and for electrical connection (welding, soldering or press fitting) of the inner conductor. The easily detachable electrical connection to the device take place via the screwed connection. In case of repair, either the inner conductor can be separated by a tool and then the section screwed off and replaced by a new one. Afterwards, the (original) metal clad cable can be reused, or the metal clad cable can be screwed off entirely undamaged and used several times.

A third solution is to thread the outside of the inner conductor. Likewise the one part made as a terminal stud on the device must be provided with an outside opposite thread matched to the inside thread. The two parts are then drawn onto one another by means of a connecting sleeve which has two matched inside threads of opposite turns when the connecting sleeve is rotated. They are braced securely in the sleeve so that, on the one hand, a well-protected, corrosion-free connection results, and on the other hand, easy detachment in case of repair results.

In another embodiment of the invention the terminal connection is provided with an outer protective sleeve against dirt and/or moisture, which is made in the form of a union nut and which can be screwed using an internal thread onto one of the parts of the terminal connection which are provided with an outside thread. This part allows not only good protection, but at the same time also strain relief.

The protective sleeve can fit over a collar which is seated on the metal-clad cable and fixed there and can have at least one sealing edge on the contact surfaces between these parts to improve the sealing function. The terminal stud can furthermore have a hollow shaft which is concentric to it, which is made as a gland, and which abuts the collar, further improving tightness. Here there can be additional sealing edges on the contact surfaces.

BRIEF DESCRIPTION OF THE DRAWINGS

The invention is detailed below with reference to the drawings in three embodiments, in which:

FIG. 1 shows a catalytic converter with one part of the terminal connection, in a schematic cross section;

FIG. 2 shows the electrical power lead with the other part of the terminal connection;

FIG. 3 shows the spare power lead with an adaptor piece as another part of the terminal connection;

FIG. 4 shows a second embodiment of the terminal connection in a schematic cross section;

FIG. 5 shows the terminal connection according to FIG. 4 as a schematic exploded view;

FIG. 6 shows a third embodiment of a terminal connection; and

FIG. 7 shows the terminal connection according to FIG. 6 as a schematic exploded view.

DETAILED DESCRIPTION OF THE PREFERRED EMBODIMENTS

The catalytic converter labelled 10 throughout in FIG. 1 has catalytic converter 11 proper with a plurality of channels 12 which run parallel to one another and through which exhaust gas flows.

In catalytic converter 11 there are individual heatable foils which have saddle 14 bent at a right angle and terminal stud 15 attached to it over terminal block 13. The terminal stud is provided with blind hole 16 on its front side.

Concentric to terminal stud 15 is gland 17 which is provided on its front end with outside thread 18. In the intermediate area there can be mechanical and electrically insulating support 19 for the terminal stud.

Power lead 20 is shown in FIGS. 2 and 3. It has flexible inner conductor 21 which is separated from external metal shroud 22 by means of electrical insulation, preferably electrically insulating mineral 23. To seal layer 23, on the two ends of metal shroud 22 there can be insulation 24 or impregnation or a glass closure.

Metal collar 25 which is U-shaped in cross section is seated on one end of power lead 20 and is soldered or welded to metal shroud 22. The inner conductor is furthermore provided with notch 26 which acts as a predetermined breaking point, where the inner conductor can be separated using a tool.

External protective sleeve 27 is seated over the detachable power lead and especially collar 25. The sleeve has inside thread 28 which can be screwed in the manner of a union nut as protection against dirt and moisture over the power lead onto outside thread 18 of gland 17, protective sleeve 27 over collar 25 being used at the same time as strain relief for inner conductor 21. In the plugged-together state, free end 29 of inner conductor 21 protrudes such that it projects into blind hole 16 of one part of the power lead and can be welded or soldered there or can be fixed by means of an interference fit and at the same time can be connected in an electrically conductive manner, after which protective sleeve 27 of the other part of the power lead can be screwed onto outside thread 18.

In case of repair, protective sleeve 27 is screwed off and free end 29 of inner conductor 21 at breaking point 26 is separated by means of a tool.

Afterwards, the replacement lead shown in FIG. 3 which has a free end provided with fitting sleeve 30 on inner conductor 21 can be used. Here fitting sleeve 30 is made such that with its inside it fits over the outside of terminal stud 15 and in this state can be likewise soldered or welded or fixed in position by means of a press fit, fitting sleeve 30 at the same time containing the separated part of free end 29 of inner conductor 21 of power lead 20, that is, the part in blind hole 16. In this state the fitting sleeve 30 is then soldered to the free end of terminal stud 15.

An alternative second embodiment is shown in FIGS. 4 and 5, the same reference numbers labeling the same parts and therefore not requiring repeated description. There is a separate screw-on section 40 which is screwed into inside thread 41 on the face of terminal stud 15 with outside thread 42 and which contains blind hole 16 for holding free end 29 of inner conductor 21. Otherwise, the first and the second embodiments coincide, with the minor difference that the connection between section 40 and terminal stud 15 is a screwed connection.

In the third embodiment shown in FIGS. 6 and 7, both free end 50 of terminal stud 15 and free end 29 of inner conductor 21 on its surface 51 each have one outside thread 52, 53 which turn opposite one another. To join them, connection sleeve 60 with one matched inside thread 61, 62 and regional outer shape 63 each is joined to one another. Outside shape 63 is used to engage a tool, preferably an open-end wrench. When connecting sleeve 60 is turned in one direction, two free ends 29, 50 of the inner conductor connection sleeves 50, 51 are drawn into inside thread 61, 62 and braced against one another on the end, so that a strong connection results.

In this third embodiment, only one screwed connection is made both for force-fit and also electrical connection of the two conductors. Just as in the second embodiment, a spare power lead (first embodiment) is unnecessary. The original electrical power lead as the metal-clad cable can be used as many times as desired.

What is claimed is:

1. Connection between an electrical power lead, the electrical power lead comprising a metal-clad cable with a metal shroud and at least one electrical inner conductor electrically insulated from the metal shroud by mineral, and an electrically heatable catalytic converter, the inner conductor and the electrically heatable catalytic converter being connected to one another via a fixed, long-term, detachable terminal connection usable at high temperatures, a first part of which being located on the electrically heatable catalytic converter and being connected to an electrical conductive terminal stud of the electrically heatable catalytic converter, and a second part being provided on a free end of the electrical power lead, wherein the terminal stud and the inner conductor of the electrical power lead have one outside thread each with different screw direction and wherein there is further provided a connection sleeve with an inside thread on respective ends matched thereto.

2. Connection according to claim 1, wherein the terminal connection is provided with an external protective sleeve against dirt and/or moisture.

3. Connection according to claim 1, wherein the terminal stud is an inner conductor of another metal-clad cable.

4. Connection according to claim 1, wherein the connection sleeve is provided with an external square or hexagon shape.

5. Connection according to claim 1, wherein the electrical power lead is provided with collar seated on the metal shroud of the metal-clad cable.

6. Connection according to claim 5, wherein the collar is soldered or welded onto the metal shroud.

7. Connection according to claim 5, wherein the collar is surrounded by a protective sleeve.

8. Connection according to claim 1, wherein the mineral between the inner conductor and the metal shroud of metal-clad cable is sealed on the end by a sealing mass and/or impregnation.

9. Connection according to one of claim 8, wherein electrical insulation is provided on the terminal stud as ceramic insulation applied by plasma spraying.

10. An electrically heatable catalytic converter, comprising:
    a plurality of foils having channels extending therethrough for passage of exhaust gas, at least some of the foils being electrically heatable foils;
    a terminal stud electrically connected to the electrically heatable foils;
    a power lead comprising a metal shroud, a flexible inner conductor provided within the metal shroud, and an electrically insulating mineral provided between the metal shroud and the flexible inner conductor; and
    a detachable connection electrically connecting the terminal stud to the power lead, the detachable connection comprising a first part connected to the terminal stud and a second part connected to the flexible inner conductor of the power lead and allowing a long-term, fixed connection of the power lead to the terminal stud which can be disconnected and replaced, wherein a free end of each of the terminal stud and the flexible inner conductor is provided with an outside thread, the thread of the terminal stud and the thread of the flexible inner conductor turn opposite one another, and wherein the detachable connection comprises a connection sleeve having a threaded internal bore in each end matching the respective threads of the terminal stud and the flexible inner conductor, whereby the respective threaded ends of the terminal stud and the flexible inner conductor are screwed into the connection sleeve by turning the connection sleeve in one direction.

* * * * *